(12) United States Patent
Kitawaki

(10) Patent No.: US 7,668,114 B2
(45) Date of Patent: Feb. 23, 2010

(54) COMMUNICATION APPARATUS AND METHOD WITH ENHANCED ANONYMITY VIA MODIFIED USE OF ADDRESSES

(75) Inventor: Haruyuki Kitawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/859,679

(22) Filed: Jun. 3, 2004

(65) Prior Publication Data

US 2004/0258005 A1 Dec. 23, 2004

(30) Foreign Application Priority Data

Jun. 6, 2003 (JP) ............................. 2003-162160

(51) Int. Cl.
  *H04L 12/28* (2006.01)
  *H04L 12/56* (2006.01)
  *G06F 15/16* (2006.01)
(52) U.S. Cl. ...................... 370/254; 370/389; 709/245
(58) Field of Classification Search ........................ None
See application file for complete search history.

(56) References Cited

U.S. PATENT DOCUMENTS

| | | | | |
|---|---|---|---|---|
| 5,909,440 | A * | 6/1999 | Ferguson et al. | 370/389 |
| 6,412,003 | B1 * | 6/2002 | Melen | 709/225 |
| 6,493,765 | B1 * | 12/2002 | Cunningham et al. | 709/245 |
| 6,609,152 | B1 | 8/2003 | Ono | |
| 6,781,982 | B1 * | 8/2004 | Borella et al. | 370/352 |
| 6,892,245 | B1 * | 5/2005 | Crump et al. | 709/245 |
| 6,917,620 | B1 * | 7/2005 | Sindhu et al. | 370/401 |
| 7,161,929 | B1 * | 1/2007 | O'Neill et al. | 370/349 |
| 7,170,885 | B2 * | 1/2007 | Hirota et al. | 370/351 |
| 7,286,468 | B2 * | 10/2007 | Scudder et al. | 370/219 |
| 7,489,699 | B2 * | 2/2009 | Sindhu et al. | 370/401 |
| 7,571,156 | B1 * | 8/2009 | Gupta et al. | 707/3 |
| 2002/0105954 | A1 * | 8/2002 | Craig et al. | 370/401 |
| 2002/0124091 | A1 * | 9/2002 | Kurose et al. | 709/228 |
| 2003/0225912 | A1 * | 12/2003 | Takeda et al. | 709/246 |
| 2004/0090913 | A1 * | 5/2004 | Scudder et al. | 370/219 |
| 2004/0095944 | A1 * | 5/2004 | Mitchell | 370/401 |
| 2004/0111529 | A1 * | 6/2004 | Parmar | 709/245 |
| 2004/0203596 | A1 * | 10/2004 | Sreemanthula et al. | 455/411 |
| 2005/0102415 | A1 * | 5/2005 | Ishiyama et al. | 709/238 |

OTHER PUBLICATIONS

R. Draves; "Default Address Selection for IPv6"; http://www.ietf.org/internet-drafts/draft-ietf-ipv6-default-addr-select-09.txt; Aug. 6, 2002; (2 pp).

T. Narten et al.; "Privacy Extensions for Stateless Address Autoconfiguration IPv6"; RFC3041; http://www.ietf.org/rfc/rfc3041.txt; Jan. 2001; (16 pp).

T. Narten et al.; "Neighbor Discovery for IP Version 6 (IPv6)"; RFC2461; http://www.ietf.org/rfc/rfc2461.txt; Dec. 1998; (87 pp.).

* cited by examiner

*Primary Examiner*—Gregory B Sefcheck
(74) *Attorney, Agent, or Firm*—Cowan, Liebowitz & Latman, P.C.

(57) ABSTRACT

A communication apparatus receives identification information and generates source information indicating a source of transmission made based on the received identification information. The communication apparatus changes the source information and a transmission route. The transmission route corresponds to the identification information used in generating the source information.

5 Claims, 6 Drawing Sheets

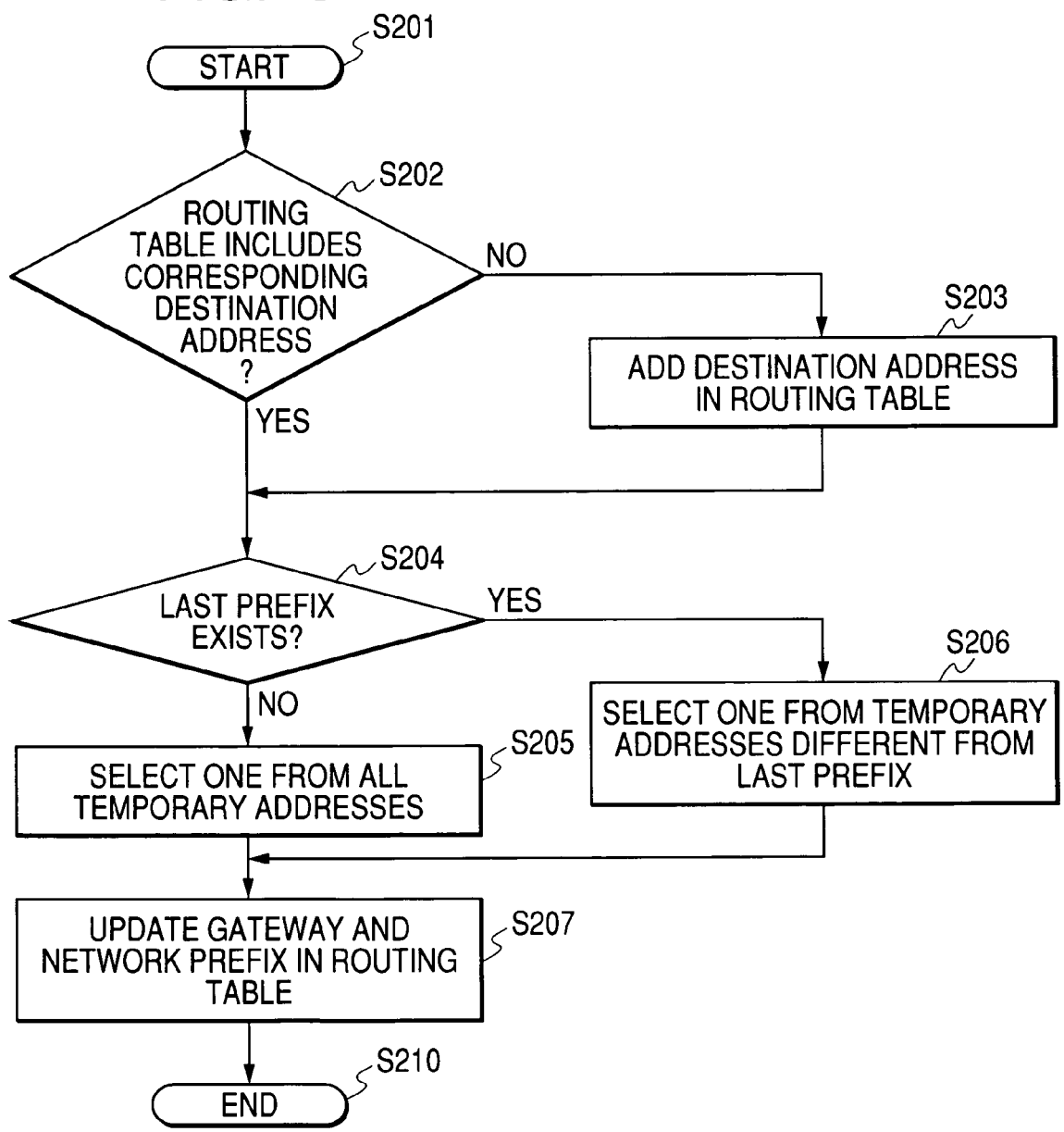

FIG. 7A

| DESTINATION ADDRESS | GATEWAY | LAST NETWORK PREFIX |
|---|---|---|
| default | fe80 :: 1000 | 2001: 1000 :: /64 |
| | | |
| | | |

FIG. 7B

| DESTINATION ADDRESS | GATEWAY | LAST NETWORK PREFIX |
|---|---|---|
| default | fe80 :: 1000 | 2001: 1000 :: /64 |
| 2001: 340 :: 100 | | |
| | | |

FIG. 7C

| DESTINATION ADDRESS | GATEWAY | LAST NETWORK PREFIX |
|---|---|---|
| default | fe80 :: 1000 | 2001: 1000 :: /64 |
| 2001: 340 :: 100 | fe80 :: 2000 | 2001: 2000 :: /64 |
| | | |

FIG. 7D

| DESTINATION ADDRESS | GATEWAY | LAST NETWORK PREFIX |
|---|---|---|
| default | fe80 :: 1000 | 2001: 1000 :: /64 |
| 2001: 340 :: 100 | fe80 :: 1000 | 2001: 1000 :: /64 |
| | | |

COMMUNICATION APPARATUS AND METHOD WITH ENHANCED ANONYMITY VIA MODIFIED USE OF ADDRESSES

BACKGROUND OF THE INVENTION

1. Field of the Invention

The present invention relates to a communication apparatus and method.

2. Related Background Art

The Internet Protocol Version 4 (IPv4) has been used for many years in the Internet communication. However, the Internet Protocol Version 6 (IPv6) is proposed as a solution to the problems of the IPv4, such as an insufficient number of addresses, and its practical usage is gradually started.

The IPv6 address has a length of 128 bits. The upper 64 bits of the IPv6 address are data mainly relating to routing and are called "network part." The lower 64 bits are data which is mainly necessary to finally specify a termination under one router and are called "host part."

While data in the network part can be configured manually, it can be automatically set by a stateless autoconfiguration technique. Briefly, a device asks a router to send 64-bit data (network prefix) together with a packet called a router advertisement, and sets the received network prefix in the network part to accomplish autoconfiguration. The stateless autoconfiguration is described in detail in, for example, RFC2461 ("Neighbor Discovery for IP Version 6 (IPv6)," T. Narten, E. Nordmark, W. Simpson, December 1998).

A typical IPv6 address uses data called an interface ID for data in the host part. The interface ID is generated as follows based on the MAC address of 48 bits of the Ethernet (registered trademark) interface when the Ethernet (registered trademark) is used in a physical layer.

The IEEE identifier (MAC address) of the Ethernet (registered trademark) is an address of 6 bytes (48 bits), the first three bytes of which are managed and assigned by the IEEE as a manufacture vender code. The remaining three bytes are managed and assigned by each vender in such a way as not to cause overlapping. As codes which are managed by a vender are allocated in such a way as to differ from one Ethernet (registered trademark) card to another, a unique address, only one in the world, corresponds to each Ethernet (registered trademark) card and is used as an address (data link layer address) at the time of transmitting and receiving data on the Ethernet (registered trademark). 64-bit data which is acquired by dividing the MAC address of the Ethernet (registered trademark) into two sub addresses each of three bytes, inserting "FFFE," a hexadecimal number, between the two sub addresses and setting the seventh bit from the top to "1" is called an interface ID.

With the typical IPv6 address used, the interface ID in the host part is unique as long as the same network interface is used, whereas the network part depends on the network environment. It is therefore possible to trace a device equipped with a network interface by conducting a search using the interface ID as a key. As a device is traceable, the action of a user who uses that device is traceable too. As long as an interface ID is used in the host part, therefore, it is probable that the privacy of the user who uses that device would be invaded.

As a solution to the problem, a special address called "temporary address" is proposed. This temporary address is defined by RFC3041 ("Privacy Extensions for Stateless Address Autoconfiguration IPv6," T. Narten, R. Draves, January 2001). A temporary address is an address which makes it hard to specify a device by generating different 64-bit data every predetermined period and using the 64-bit data in the host part (lower 64 bits of the IPv6 address).

The following briefly describes how to generate a temporary address. The MD5 message digest algorithm is used to generate a temporary address. "MD5" is a function which outputs 128 bits corresponding to an input of some bits. In this example, 128 bits are input. The upper 64 bits and lower 64 bits of the 128-bit input are configured as follows. The interface ID is the upper 64 bits. A random value of 64 bits generated by some method or the lower 64 bits of the computation result of the last MD5 are the lower 64 bits of the 128-bit input. With the 128 bits being an input, the MD5 message digest algorithm is carried out and the upper 64 bits of the computation result of 128 bits are acquired. The seventh bit in the acquired 64 bits from the left is set to 0 and the resultant 64 bits are treated as the host part. The lower 64 bits of the computation result are recorded to be used in the computation of the next MD5. The details are given in RFC3041.

If different host parts are generated every predetermined period by the method discussed above and a global address using the different host parts is used in communication, it is harder to determine if devices are the same as compared with a case where a global address simply including an interface ID is used in communication, and brings about an effect of preventing privacy violation.

Because the lower 64 bits of the IPv6 address are changed every predetermined period by using the temporary address, the anonymity becomes greater as compared with a case where an interface ID is used for the lower 64 bits.

However, the network part belongs to an Internet service provider or an organization which uses the same devices and is not basically changed unless a network controller does setting in such a way as to change the network prefix. When a stationary type device belongs to a single organization and always uses the same network part, particularly, the organization is likely to be specified. If an organization is specified, one can take various actions, such as requesting a log of the network controller, to specify a user from that device.

In case of wide wireless communication using a mobile IP or so, a network prefix may change as a base station is changed. While this overcomes the problem, it is necessary to actively move a device to change the network prefix. In case where a device is located over two or more radio zones in mobile communication, a zone having a stronger radio wave intensity (higher communication sensitivity) is normally selected to establish communication. If one radio zone apparently has a strong radio wave intensity and no switching of a base station does not take place, therefore, the network prefix does not change, so that the problem is left unsolved. The same is true of a case where there are three or more base stations involved.

SUMMARY OF THE INVENTION

Accordingly, it is an object of the invention to enhance anonymity.

It is another object of the invention to ensure selective usage of one of temporary addresses with different network prefixes as a source address.

It is a different object of the invention to reduce the amount of information to be stolen by tapping or so.

It is a further object of the invention to disperse the load of a routing process done by a router.

It is a still further object of the invention to permit the modified use of not only the lower 64 bits but also the upper 64 bits as a source IPv6 address under the condition that two or more network prefixes are available.

The other objects of the invention will become apparent from the detailed description of preferred embodiments given hereinafter.

BRIEF DESCRIPTION OF THE DRAWINGS

FIG. 6 is a flowchart for setting one of temporary addresses with different network prefixes as a source address at a given timing; and FIGS. 7A, 7B, 7C and 7D are diagrams showing routing tables to be referred to in the second embodiment.

DESCRIPTION OF THE PREFERRED EMBODIMENTS

First Embodiment

The first embodiment is premised on that a device is connected to a network under the control of two routers.

Figure 1:
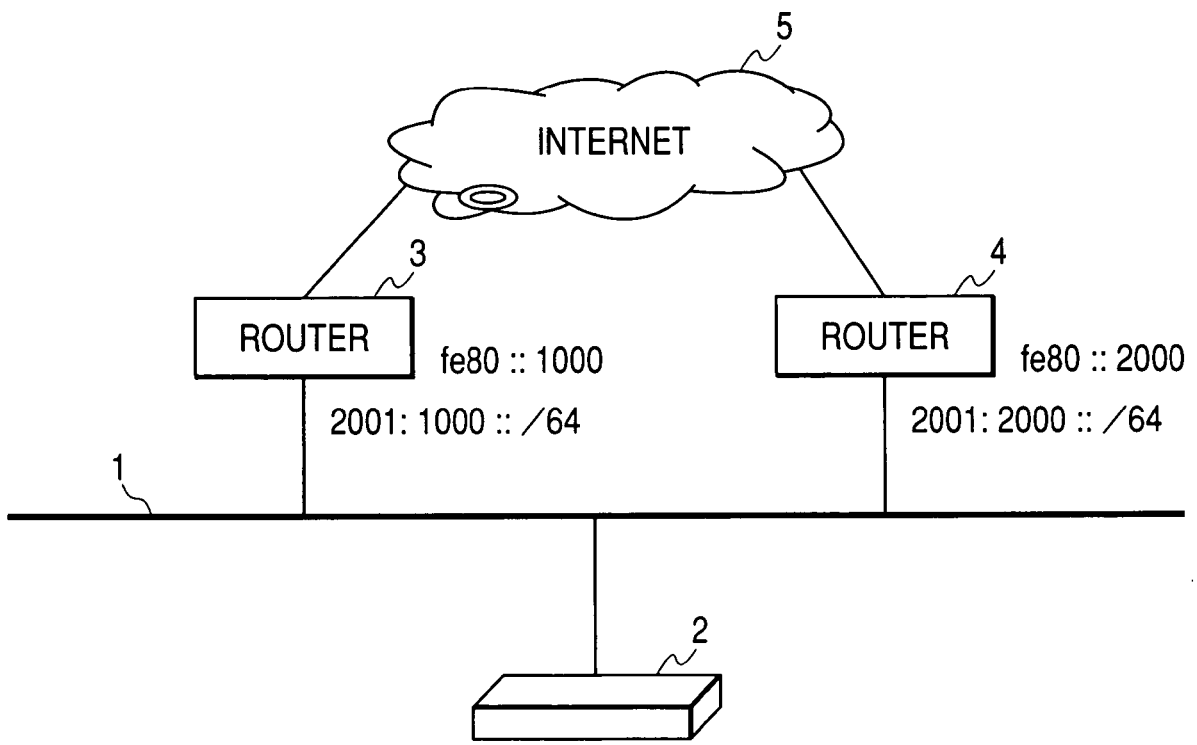
FIG. 1 is a diagram showing an example of a network according to a first embodiment of the invention.

FIG. 1 is a diagram showing the environment to which the embodiment is applied. Two routers 3 and 4 are connected to a link local network 1. The types of the physical layers of the link local network 1 are not particularly specified, as long as communication by IPv6 is possible at an upper physical layer, as done in the Ethernet (registered trademark), IEEE802.11 or Bluetooth. Wireless communication is also possible on the premise that a temporary address as defined by RFC3041. A physical layer is not a particular object in the embodiment.

Figure 2:
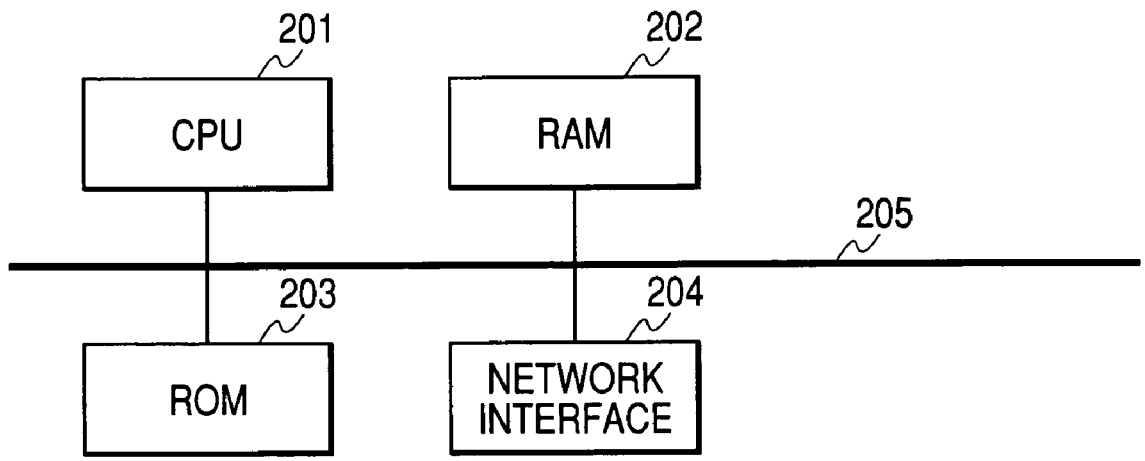
FIG. 2 is a diagram illustrating the general structure of a device 2 according to the first embodiment.

FIG. 2 is a diagram illustrating the general structure of the device 2. A CPU 201 controls the general operation of the device 2. A RAM 202 is a temporary memory device and a ROM 203 is a read only memory where unerasable data, such as a program, is stored. A network interface 204 is the interface that is used when the device 2 exchanges data with an external device. A bus 205 is an internal bus which connects individual modules. The device 2 may further include a large-capacity memory device, such as a hard disk, and an interface for input/output devices, such as a display, a keyboard, a mouse and a print-out unit. The device 2 is connectable to the link local network 1 and can undergo stateless autoconfiguration as defined by RFC2461.

The network interface 204 is a reception unit which receives a network prefix, and a CPU 301 is an alteration unit which changes the source address and route. As described later, the CPU 301 as an alteration unit changes the source address to a temporary address whose network prefix differs from that of the source address before alteration. In the embodiment, the CPU 301 as an alteration unit changes the source address to a temporary address whose network prefix differs from that of the source address before alteration and changes the route too.

Figure 3:
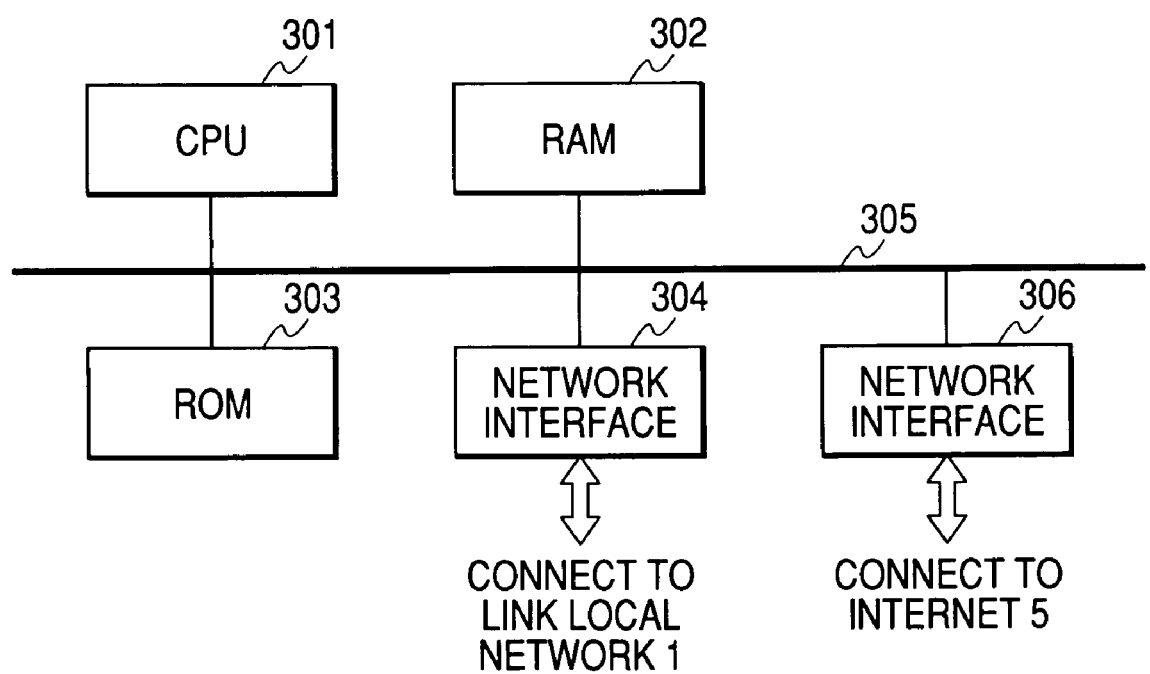
FIG. 3 is a diagram illustrating the general structure of routers 3 and 4 which constitute a network according to the first embodiment.

FIG. 3 is a diagram illustrating the general structure of the routers 3 and 4. The routers 3 and 4 have the identical structure. The CPU 301 controls the general operation of the router 3. A RAM 302 is a temporary memory device and a ROM 303 is a read only memory where unerasable data, such as a program, is stored. A bus 305 is an internal bus which connects individual modules. The router 3 or 4 may further include a large-capacity memory device, such as a hard disk, and an interface for input/output devices, such as a display, a keyboard, a mouse and a print-out unit.

Network interfaces 304 and 306 are used when the routers 3 and 4 exchange data with an external device. The network interface 304 is connected to the link local network 1 (inward to the local) and the network interface 306 is connected to an Internet 5 (outward to the Internet). The routers 3 and 4 can send a router advertisement which becomes necessary in stateless autoconfiguration as defined by RFC2461.

In the embodiment, the router 3 advertises a network prefix "2001:1000::/64" to the link local network 1 and the router 4 advertises a network prefix "2001:2000::/64" thereto. It is assumed that the link local address of the network interface 304 that faces the link local network 1 of the router 3 is "fe80::1000" while the link local address of the router 4 is "fe80::2000."

The device 2 is connected to the environment as shown in FIG. 1. The device 2 receives a router advertisement sent from the network interface 304 of the router 3, 4. The device 2 generates and configures a temporary address according to RFC3041 in response to the reception of the router advertisement.

For the sake of descriptive convenience, the first temporary address generated in response to the router advertisement from the router 3 is a temporary address 3-1 (2001:1000::3333) and the first temporary address generated in response to the router advertisement from the router 4 is a temporary address 4-1 (2001:2000::4444). The device 2 stores the link local addresses of the network interfaces 304 of the routers 3 and 4 and temporary addresses (3-1 and 3-2) corresponding to the routers 3 and 4 in the RAM 202. It is assumed that the device 2 uses the temporary address 3-1 and performs communication using the router 3 as a default router.

Figure 4:
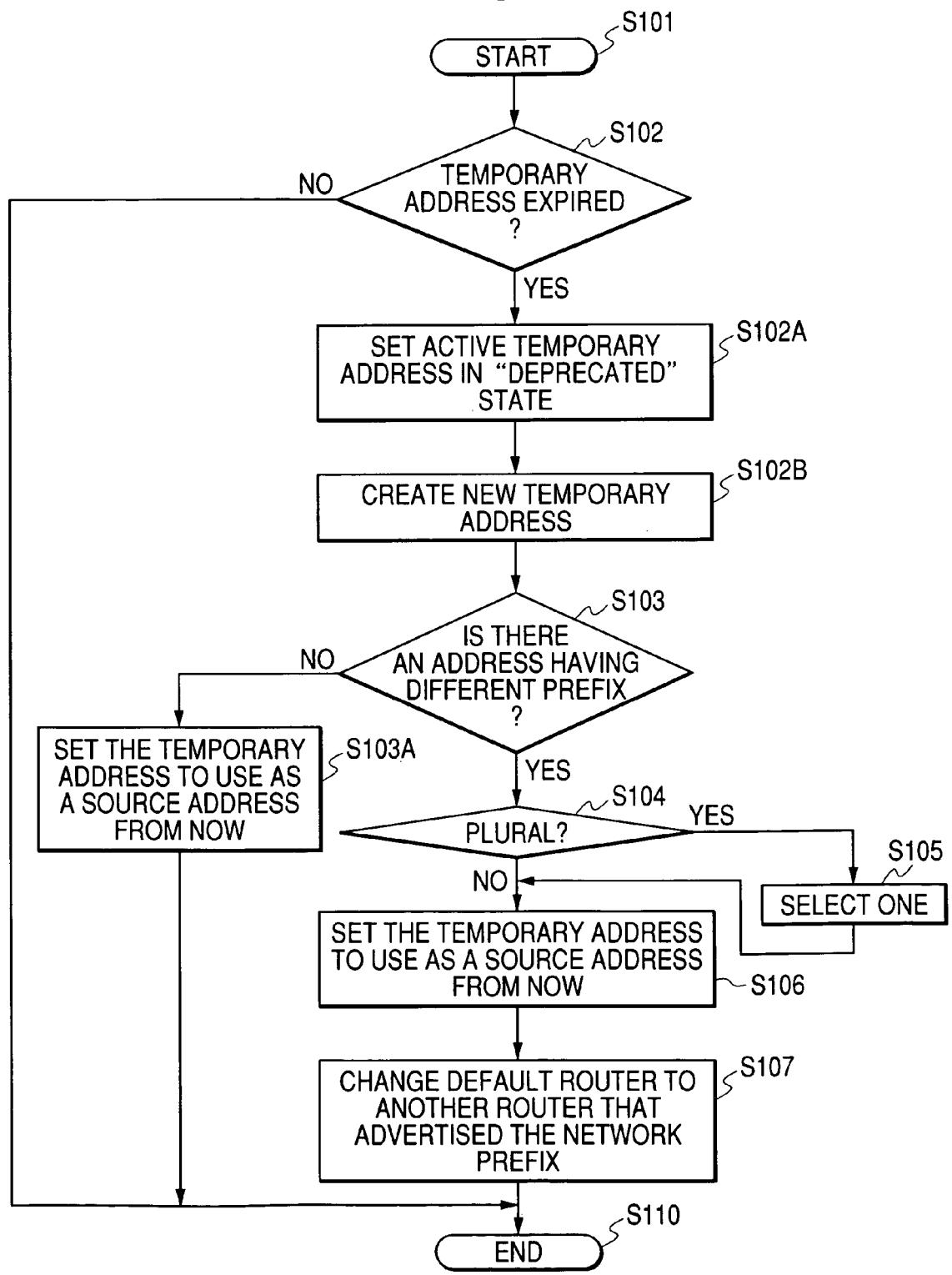
FIG. 4 is a flowchart for alteration of a source address which is triggered by update of a temporary address.

With the conditions premised, the embodiment will be described referring to a flowchart illustrated in FIG. 4. FIG. 4 is a flowchart illustrating the operation of an algorithm which changes the source address and route. A program which executes the flowchart in FIG. 4 is prestored in the ROM 203 of the device 2, is developed in an executable form on the ROM 202 or a temporary storage unit (hard disk or so), and is executed by the CPU 201.

After the flow starts at S101, the CPU 201 of the device 2 checks if the validness of an active temporary address or a temporary address which has been used (e.g., temporary address 3-1) is expired. If the temporary address is valid, the result of the decision at S102 becomes NO and the flow goes to S110 to terminate the routine. In this case, the use of the temporary address (3-1) continues. In addition, configuration to set the router 3 as the default router is maintained.

If the temporary address is expired, on the other hand, the result of the decision at S102 becomes YES and the flow goes to S102A to set the expired temporary address in the "deprecated" state. The "deprecated" state is the state where the temporary address, though expired, has been used since before expiration and a new temporary address cannot be used soon (e.g., when a TCP connection is made using the address and the connection is not been disconnected). The "deprecated" temporary address is not used in subsequent new communication. It is to be noted that while the TCP connection is made, communication is made using the temporary address as the source address.

Thereafter, a new temporary address is generated at S102B and the flow goes to S103. The new temporary address is called a "preferred" temporary address that is likely to be used in communication which will newly be started thereafter. Note however that the network prefix is the same as a "deprecated" temporary address (3-1). In the embodiment, the temporary address 3-1 is "deprecated" and a temporary address which is the same as the temporary address 3-1 in network prefix "2001:1000::" but differs in host part is generated. The newly generated temporary address is called a temporary address 3-2.

At S103, the CPU 201 of the device 2 checks the network interface 204 and checks if there is a temporary address which contains a network prefix different from the network prefix that has been used in the last "deprecated" temporary address (3-1). When there is no such temporary address, the result of decision at S103 becomes NO and the flow goes to S103A. At S103A, the temporary address 3-2 is configured to be used as a source address in the next and subsequent communications and the flow goes to S110. The configuration to set the default router to the router 3 continues.

If there is a temporary address containing a different network prefix, on the other hand, the result of the decision at S103 becomes YES and the flow goes to S104. In the embodiment, as there is a temporary address 4-1 whose network prefix "2001:2000::/64" differs from the network prefix "2001:1000::/64" of the temporary address 3-1, the decision result becomes YES.

At S104, it is checked if there are plural temporary addresses found as a result of the decision made at S103. When there is only one temporary address, the result of the decision is NO, and the flow goes to S106. When there are two or more temporary addresses, the result of the decision is YES, and the flow goes to S105. As there is only one temporary address in the embodiment, the decision result becomes NO. If there are three or more routers which advertise a network prefix (if there are plural routers other than the default router 3), temporary addresses containing different network prefixes can be generated. One temporary address or two or more temporary addresses found at S103 are "preferred" temporary addresses.

When the decision result at S104 shows the presence of two or more "preferred" temporary addresses which contain network prefixes different from the network prefix of the "deprecated" temporary address, one of the temporary addresses is selected at S105. The selection algorithm is not particularly specified. For example, one of a plurality of temporary addresses may be selected at random, or a table having history information affixed to each network prefix may be managed to evenly use different network prefixes. Alternatively, the following method may be employed to select an appropriate temporary address. The remaining temporary addresses are given numbers starting at 0 and incremented by 1 at a time. All the lower 64 bits of the currently active temporary address are all added and the resultant value is divided by the number of the remaining temporary addresses. The remainder is compared with the number affixed last time, and the temporary address which has a match is selected.

When one temporary address is selected at S105 in the above-described manner, the flow goes to S106.

When there is only one temporary address found at S103, the found temporary address is configured to be used as a source address in the next and subsequent communications at S106. When there are plural temporary addresses found at S103, the temporary address selected at S105 is configured to be used as a source address in the next and subsequent communications at S106. One specific way of configuration available is that the algorithm which selects one source address from a plurality of source address candidates is modified and selects the selected temporary address with the top priority as defined in, for example, the Internet draft called "Default Address Selection for IPv6," draft-ietf-ipv6-default-addr-select-09.txt, Richard Draves, Aug. 6, 2002. With the configuration done, the flow goes to S107. In the embodiment, configuration is done in such a way that the temporary address 4-1 (one of temporary addresses which contain network prefixes different from the network prefix used in the "deprecated" temporary address (3-1)) is used with the highest priority.

At S107, the default router registered in the routing table of the device 2 is changed to the router to which the network prefix of the temporary address configured at S106 is advertised. In the embodiment, the default router is changed to the router 4 from the router 3. That is, the gateway for the destination "default" is changed to "fe80::2000" from "fe80::1000." This process allows a packet addressed to an external destination to be transmitted or received through the router 4. If a specific destination address is configured in the routing table in such a way as to pass through the router 3, the configuration is changed so that the destination address passes through the router 4 as a gateway. Then, the flow goes to S110 to terminate the routine. Although the routing table is stored in the RAM 202 in the embodiment, it can be stored in any readable and writable recording medium.

When the temporary address 4-1 is expired, the routine illustrated in FIG. 4 is applied again. In this case, when the temporary address 3-2 is not expired, the temporary address 3-2 is used as a source address. When the temporary address 3-2 is expired, the newly generated temporary address that has the network prefix "2001:1000::/64" and is not expired is used as a source address.

According to the method, every time the temporary address is expired, a temporary address with a different network prefix can be used as a source address.

That is, the device 2 changes the destination address and the route. This method includes a reception procedure of receiving a network prefix. The device 2 generates a temporary address from the received network prefix. The method of changing the destination address and route includes a source address changing procedure of changing the destination address and a route changing procedure of changing the route. The source address changing procedure changes the destination address to a temporary address whose network prefix differs from that of the destination address before change. In the embodiment, when the temporary address is expired, the destination address is changed to a temporary address whose network prefix differs from that of the destination address before change.

A program which changes the destination address and route is stored in the ROM 203 and the CPU 201 reads the program from the ROM 203 and runs it. The ROM 203 is a recording medium in which the program is stored in such a way as to be readable by the CPU 201.

Although the foregoing description of the embodiment has been given of the case where there are two routers and two types of network prefixes are advertised, the invention is likewise adaptable to a case where there are three or more routers or a case where three or more network prefixes are advertised.

Second Embodiment

In the first embodiment, the device 2 changes the destination address and selects a temporary address which has different network prefix, when triggered by expiration of the temporary address. At that time, the default router is changed and all the routes for communication of the device to the Internet are changed.

The following discusses a method according to the second embodiment which uses a temporary address with a different network prefix as a source address every time communication is initiated.

The device 2 receives a router advertisement sent from the network interface 304 of the router 3, 4, as per the first embodiment. The device 2 generates and configures a temporary address according to RFC3041 in response to the reception of the router advertisement. For the sake of descriptive convenience, the first temporary address generated in response to the router advertisement from the router 3 is a temporary address 3-1 (2001:1000::3333) and the first temporary address generated in response to the router advertisement from the router 4 is a temporary address 4-1 (2001: 2000::4444). The device 2 stores the link local addresses of the network interfaces 304 of the routers 3 and 4 and temporary addresses (3-1 and 3-2) corresponding to the routers 3 and 4 in the RAM 202. It is assumed that the device 2 uses the temporary address 3-1 and has carried out communication using the router 3 as a default router (gateway).

Figure 5:
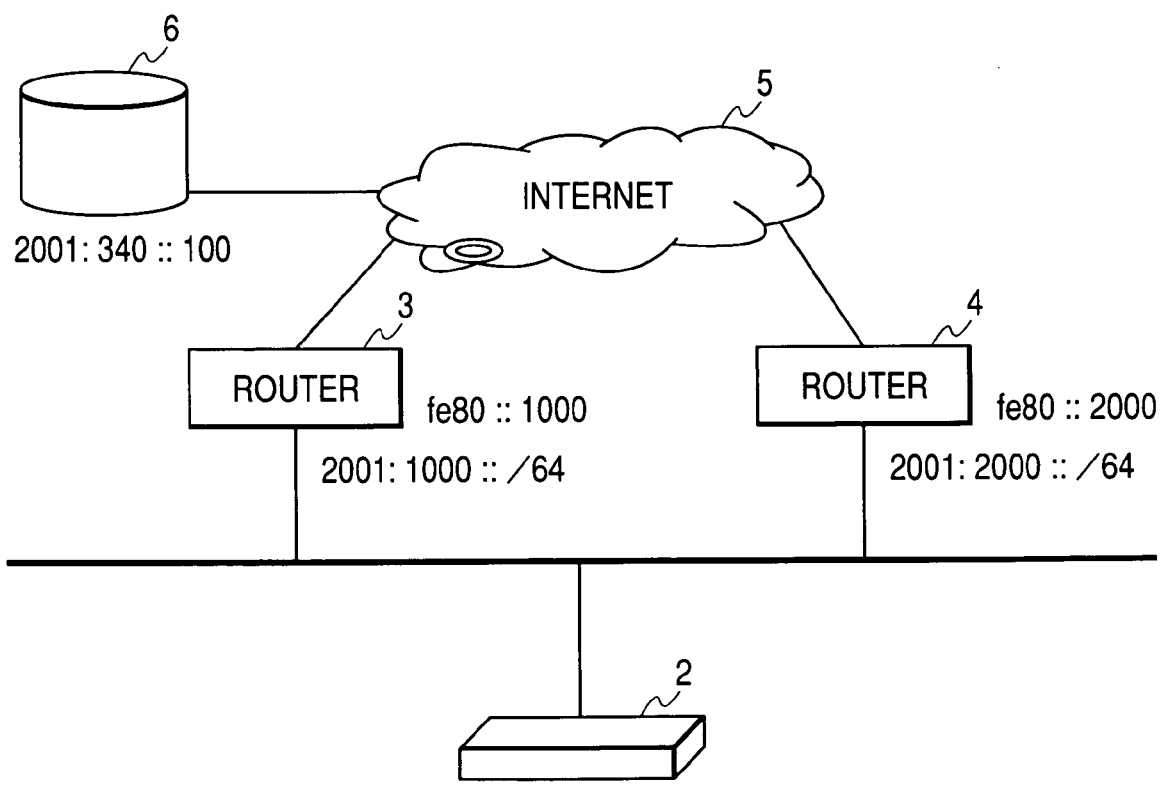
FIG. 5 is a diagram showing an example of a network according to a second embodiment of the invention.

The environment as shown in FIG. 5 is premised in the embodiment. It is assumed that a global address "2001:340:: 100" is set in a communication destination 6. The following description is given on the assumption that the device 2 communicates with the communication destination 6 under such an environment.

The embodiment will be described referring to a flowchart illustrated in FIG. 6. FIG. 6 is a flowchart illustrating the operation of an algorithm which changes the source address and route at the time the device 2 makes communication. A program which executes the flowchart in FIG. 4 is prestored in the ROM 203 of the device 2, is developed in an executable form on the ROM 202 or a temporary storage unit (hard disk or so), and is executed by the CPU 201. It is also assumed that the device 2 manages a table called a routing table transfer destinations (gateways) according to the destination addresses are recorded in the routing table. Although the routing table is stored in the RAM 202 in the embodiment, it can be stored in any readable and writable recording medium.

The flow starts at S201 where a communication destination address is to be designated.

At S202, it is checked if the designated communication destination address (128 bits) is registered as a destination address in the routing table of the device 2. The routing table of the device 2 is shown in FIG. 7A, for example. When the destination address is the "default" or the condition does not match with the condition for any other destination address, the routing table shows that a packet is transferred according to the condition given in the line of the "default." In the example in FIG. 7A, all the packets are transmitted through the gateway "fe80::1000." When the checking results in that the routing table contains the destination address which matches with the communication destination address, the result of decision becomes YES and the flow goes to S204. If the routing table has no matched destination address, the result of decision becomes NO and the flow goes to S203. Because the communication destination address "2001:340:: 100" is not registered in the routing table in FIG. 7A, the result of decision becomes NO and the flow goes to S203.

At S203, the CPU 201 adds the communication destination address as a destination address in the routing table on the RAM 202. For example, the communication destination address "2001:340::100" is added as the destination address to the routing table in FIG. 7A, yielding the table contents as shown in FIG. 7B.

The CPU 201 checks at S204 if an entry has been made to the field "last network prefix" corresponding to the communication destination address in the routing table. When the check result shows no entry made, the flow goes to S205. When the check result shows some entry made, the flow goes to S206. As no entry is made to the field "last network prefix" corresponding to the destination address "2001:340::100" in FIG. 7B in the embodiment, the flow goes to S205.

At S205, the CPU 201 selects one of the entire temporary addresses allocated to the network interface 204. This selection method is not limited. The selection may be made at random or the history of usage may be recorded for each network prefix so that the selection may be made by referring to the frequency of usage. As the temporary address 3-1 and the temporary address 4-1 are set for the network interface 204 in the embodiment, either one of the temporary addresses is selected at random. In this example, the temporary address 3-1 is to be used.

When the last network prefix is written, one of temporary addresses whose network prefixes differ from the last one is selected at S206. If the routing table as shown in FIG. 7C is set, the "last network prefix" corresponding to the destination address "2001:340::100" is "2001:2000::/64" advertised by the router 4, so that a temporary address (temporary address 3-1 in this case) other than that address is selected. If the device 2 has obtained three or more network prefixes, two or more temporary addresses are selectable at S206, so that an adequate one is selected. The selection method is not limited.

At S207, the CPU 201 makes entries in, or updates, the field "gateway" and the field "last network prefix." In the embodiment, for example, the gateway "fe80::1000" (the link local address of the network interface 304 of the router 3 which has advertised the network prefix of the temporary address 3-1) that is used by the temporary address 3-1 is written in the field "gateway" in the routing table and writes "2001:1000::/64," the network prefix of the temporary address 3-1, in the field "last network prefix," yielding the table contents as shown in FIG. 7D.

When the routing table shown in FIG. 7C which has been described in the foregoing description of S206 is set, the routing table is updated from the table in FIG. 7C to the one in FIG. 7D for the temporary address 3-1 is selected as the next temporary address.

After S207 is finished, the flow goes to S210 to terminate the routine.

The above-described operation provides the environment under which destination addresses different from one communication destination to another can be used. In the communication with the communication destination address designated at S201, the temporary address selected at S205 or S206 is used as the source address. A packet in the communication with the communication destination "2001:340::100" is transmitted or received through the router 3.

Hereinafter, every time the algorithm shown in FIG. 6 is used, the temporary address can be changed to a temporary address with a different network prefix.

In case of the routing table in FIG. 7C, for example, the CPU 201 of the device 2 refers to the routing table in FIG. 7C to check the field "last network prefix" when making transmission to the communication destination address "2001: 340::100." Then, a temporary address which has a network prefix other than the network prefix described in the field "last network prefix" is retrieved and is used as the source address.

Thereafter, every time the algorithm shown in FIG. 6 is used, the value of the network prefix described in the field "last network prefix" changes, thereby making it possible to change the source address.

If the algorithm shown in FIG. 6 is used every time, for example, a socket is generated to execute communication, communication can be done using a source address whose network prefix differs from one socket communication to another. If the algorithm is used for each packet transmission, communication can be done using a source address whose network prefix differs from one packet to another. Likewise, every time an application is activated, the algorithm shown in FIG. 6 can be used.

In other words, the algorithm shown in FIG. 6 is used before making communication at the desired frequency of usage, communication with the source address whose network prefix differs from one packet to another can be carried out.

That is, the device 2 changes the source address and route. This method includes a reception procedure of receiving a network prefix. The device 2 generates a temporary address from the received network prefix. The method of changing the destination address and route includes a source address changing procedure of changing the destination address and a route changing procedure of changing the route. The source address changing procedure changes the destination address to a temporary address whose network prefix differs from that of the destination address before change.

A program which changes the destination address and route is stored in the ROM 203 and the CPU 201 reads the program from the ROM 203 and runs it. The ROM 203 is a recording medium in which the program is stored in such a way as to be readable by the CPU 201.

In the embodiment, the update of the temporary addresses 3-1 and 4-1 themselves is not the work of the algorithm. That is, when both the temporary addresses 3-1 and 4-1 are expired, the lower 64 bits are updated as explained in the foregoing description of the first embodiment, for example, but the algorithm shown in FIG. 6 is not influenced at all.

While the preferred embodiments of the invention have been described above, the invention is not limited to the embodiments but can be modified in various other forms within the scope and equivalence of the appended claims.

What is claimed is:

1. A communication apparatus comprising:
   a communication unit configured to receive plural pieces of prefix information from a plurality of devices, and to transmit data;
   a memory unit configured to memorize a piece of prefix information which has been used in a last transmission to each of a plurality of communication destination addresses;
   a changing unit configured to change host information within source information indicating a source of transmission made by said communication unit;
   a determining unit configured to, when a first piece of prefix information is memorized in said memory unit as the prefix information which has been used in the last transmission to a first communication destination address, a second piece of prefix information is memorized in said memory unit as the prefix information which has been used in the last transmission to a second communication destination address, and the prefix information which has been used in the last transmission to a third communication destination address is not memorized in said memory unit, determine a new piece of prefix information to be used in a new transmission from the plural pieces of prefix information received by said communication unit other than the first piece of prefix information in a case where said communication unit transmits the data to the first communication destination address, determine a new piece of prefix information to be used in a new transmission from the plural pieces of prefix information received by said communication unit other than the second piece of prefix information in a case where said communication unit transmits the data to the second communication destination address, and determine a new piece of prefix information to be used in a new transmission from the plural pieces of prefix information received by said communication unit in a case where said communication unit transmits the data to the third communication destination address; and
   a setting unit configured to set the source information based on the host information changed by said changing unit and the new piece of prefix information determined in accordance with the communication destination address by said determining unit, and to set a transmission route indicating that the data transmitted from said communication unit passes a device which sent the new piece of prefix information.

2. The communication apparatus according to claim 1, wherein said transmission route indicates a device which connects a network connected with said communication unit to another network.

3. A communication method comprising:
   a reception step of receiving plural pieces of prefix information from a plurality of devices;
   a transmission step of transmitting data;
   a memory step of memorizing a piece of prefix information which has been used in a last transmission to each of a plurality of communication destination addresses in a memory;
   a change step of changing host information within source information indicating a source of transmission made at said transmission step;
   a determination step of determining a new piece of prefix information to be used in a new transmission, when a first piece of prefix information is memorized in said memory step as the prefix information which has been used in the last transmission to a first communication destination address, a second piece of prefix information is memorized in the memory step as the prefix information which has been used in the last transmission to a second communication destination address, and the prefix information which has been used in the last transmission to a third communication destination address is not memorized in said memory step, from the plural pieces of prefix information received by said reception step other than the first piece of prefix information in a case where the data is transmitted to the first communication destination address in said transmission step, determining a new piece of prefix information to be used in a new transmission from the plural pieces of prefix information received by said reception step other than the second piece of prefix information in a case where the data is transmitted to the second communication destination address in said transmission step, and determining a new piece of prefix information to be used in a new transmission from the plural pieces of prefix information received by said reception step in a case where the data is transmitted to the third communication destination address in said transmission step; and
   a setting step of setting the source information based on the host information changed in said change step and the new piece of prefix information determined in accordance with the communication destination address in said determination step, and of setting a transmission route indicating that the data of said transmission step passes a device which sent the new piece of prefix information.

4. A computer-readable medium for storing instructions executable by a processor for network communications, the medium comprising instructions to:

receive plural pieces of prefix information from a plurality of devices;

transmit data;

memorize a piece of prefix information which has been used in a last transmission to each of a plurality of communication destination addresses in a memory;

change host information within source information indicating a source of transmission made by said transmit instruction;

determine a new piece of prefix information to be used in a new transmission, when a first piece of prefix information is memorized in said memory as the prefix information which has been used in the last transmission to a first communication destination address, a second piece of prefix information is memorized in said memory as the prefix information which has been used in the last transmission to a second communication destination address, and the prefix information which has been used in the last transmission to a third communication destination address is not memorized in said memory, from the plural pieces of prefix information received by said receive instruction other than the first piece of prefix information in a case where the data is transmitted to the first communication destination address by said transmit instruction, determine a new piece of prefix information to be used in a new transmission from the plural pieces of prefix information received by said receive instruction other than the second piece of prefix information in a case where the data is transmitted to the second communication destination address by said transmit instruction, and determine a new piece of prefix information to be used in a new transmission from the plural pieces of prefix information received by said receive instruction in a case where the data is transmitted to the third communication destination address by said transmit instruction; and set the source information based on the host information changed by said change instruction and the new piece of prefix information determined in accordance with the communication destination address by said determine instruction, and set a transmission route indicating that the data of said transmit instruction passes a device which sent the new piece of prefix information.

5. A communication apparatus comprising:

a communication unit configured to receive plural pieces of prefix information from a plurality of devices, and to transmit data;

a memory unit configured to memorize a piece of prefix information which has been used in the last transmission to each of a plurality of communication destination addresses;

a determining unit configured to, when a first piece prefix information is memorized in said memory unit as the prefix information which has been used in the last transmission to a first communication destination address, a second piece prefix information is memorized in the memory unit as the prefix information which has been used in the last transmission to a second communication destination address, determine a new piece of prefix information to be used in a new transmission from the plural pieces of prefix information received by said communication unit other than the first piece of prefix information in a case where said communication unit transmits the data to the first communication destination address, and determine a new piece of prefix information to be used in a new transmission from the plural pieces of prefix information received by said communication unit other than the second piece of prefix information in a case where said communication unit transmits the data to the second communication destination address; and a changing unit configured to change, according to the new piece of prefix information determined in accordance with the communication destination address by said determining unit, source information indicating a source of transmission made by said communication unit, and to change a transmission route indicating that the data transmitted from said communication unit passes a device which sent the new piece of prefix information for changing the piece of prefix information within the source information.

* * * * *